United States Patent [19]

Flugger

[11] Patent Number: 5,031,577

[45] Date of Patent: Jul. 16, 1991

[54] TANGLE-FREE TETHER POST ASSEMBLY

[76] Inventor: Ray T. Flugger, 2975 Dutton Ave., Unit 3, Santa Rosa, Calif. 95407

[21] Appl. No.: 488,940

[22] Filed: Mar. 5, 1990

[51] Int. Cl.⁵ .................................................. A01K 3/00
[52] U.S. Cl. ..................................... 119/117; 119/123
[58] Field of Search .............. 119/117, 118, 119, 121, 119/122, 123

[56] References Cited

U.S. PATENT DOCUMENTS

| | | |
|---|---|---|
| 223,872 | 1/1880 | Ashford . |
| 227,675 | 5/1880 | Carnes et al. . |
| 417,617 | 12/1889 | Williams . |
| 444,661 | 1/1891 | Carl . |
| 1,456,627 | 5/1923 | Delbridge ........................ 119/117 |
| 2,087,176 | 7/1937 | Webb .............................. 119/121 |
| 2,790,419 | 4/1957 | Sullivan ........................... 119/121 |
| 3,100,476 | 8/1963 | Peak ................................ 119/121 |
| 4,546,730 | 10/1985 | Holland .......................... 119/117 |

FOREIGN PATENT DOCUMENTS 82557  11/1952  Norway ............................. 119/122

Primary Examiner—Robert P. Swiatek
Attorney, Agent, or Firm—Flehr, Hohbach, Test, Albritton & Herbert

[57] ABSTRACT

A tangle-free tether post assembly for tether animals which includes a post having a lower end adapted to be buried in the ground, and upper end formed to project above the ground. A tether securement assembly is mounted on the upper end of the post at a spaced distance above the ground. The tether securement assembly is positioned vertically above a rotatable sleeve which also is mounted on the post so that the combination of securement assembly and sleeve rotation ensures tangle-free tethering of animals. A ground anchor also is provided on the tether post assembly which may be used to anchor the assembly and remove the same from the ground without digging up the post.

6 Claims, 1 Drawing Sheet

U.S. Patent
July 16, 1991
5,031,577
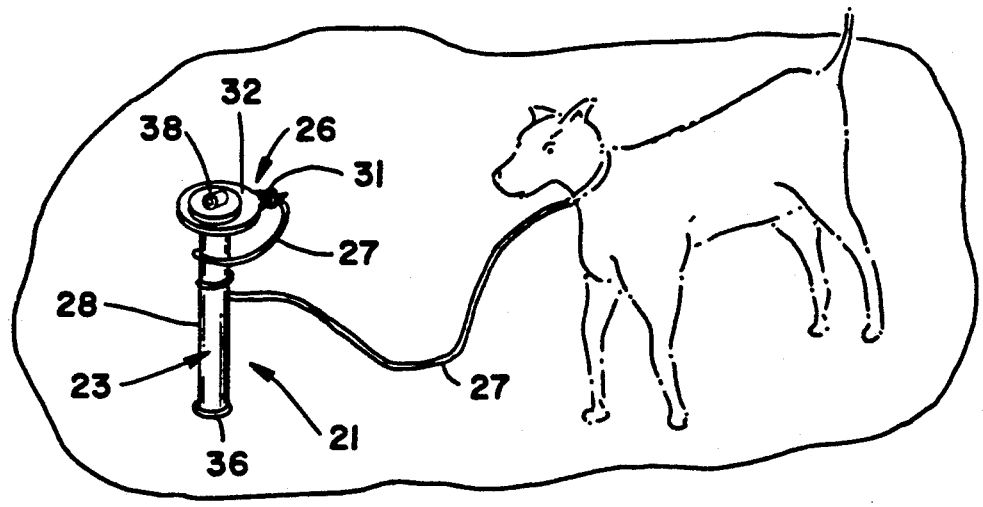
FIG_1
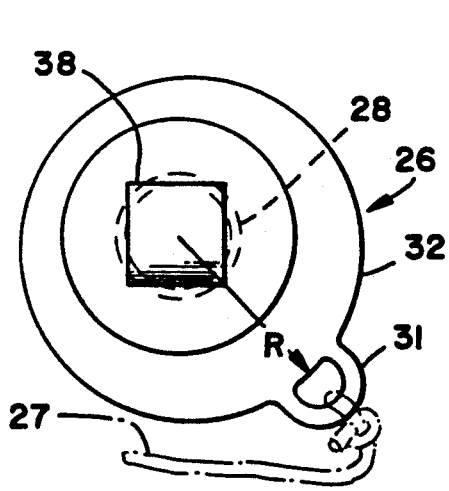
FIG_2
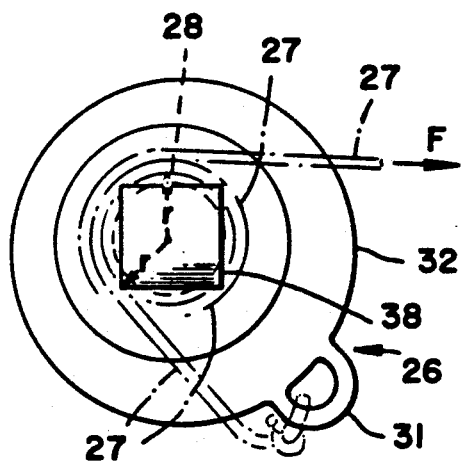
FIG_3
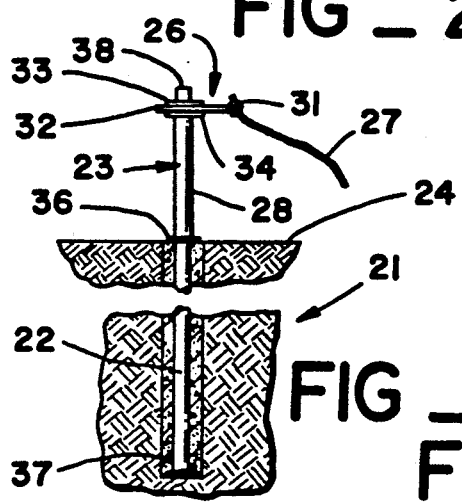
FIG_4
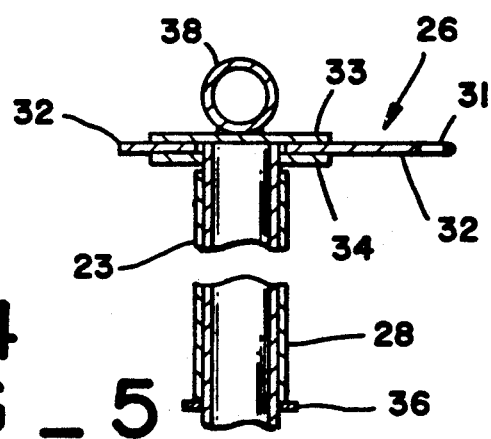
FIG_5

TANGLE-FREE TETHER POST ASSEMBLY

BACKGROUND OF THE INVENTION

The problem of providing a tether post or stake to which an animal can be tied which is tangle-free has existed for literally hundreds of years. One of the earliest solutions to this problem is found in U.S. Pat. No. 223,872, issued in 1880. Other examples of attempts to solve this problem are found in U.S Pat. Nos. 227,675, 417,617, 444,661, 2,087,176 and 3,100,476. These devices have the common approach of providing a stake having an upper end which protrudes above ground level and an element which is pivotally or rotatably secured to the protruding end of the stake so that an animal tether can be tied to the rotatable element.

Unfortunately, however, prior animal tether post assemblies invariably have not been tangle-free in actual use. The animal will be tied to the stake by a flexible tether line, and as long as the animal keeps the line relatively taut, the rotatable portion of the tether stake will turn freely as the animal moves about the stake. These ideal conditions seldom, if ever, occur.

Typically, a tethered animal will wander around the tether stake in a random fashion with the tether line becoming slack and the animal passing close by the post or stake during its wanderings. This results in two problems which produce tangling of the tether line about the tether stake. First, the slack line will become looped or wrapped several times around the stake before the animal tries to pull the line taut. Secondly, any debris in the vicinity of the stake will be pulled by the tether line up next to the stake. This second phenomenon, when coupled with the likelihood of looping the slack line around the stake results in tangling of the tether line about the stake, very often with debris, to the point of greatly restricting the animal's mobility and freedom to move with respect to the stake.

Illustrative of the problems above described are U.S. Pat. Nos. 2,087,176 and 3,100,476. In both of these patents, the rotatable element to which the tether may be secured is located substantially at ground level. The flexible tether line, therefore, will drag debris to the stake or post. Additionally, the close proximity of the stake in U.S. Pat. No. 2,087,176 to the ground will virtually assure looping of the slack line over the stake top and any debris. In the device of U.S. Pat. No. 3,100,476, a pivotally mounted sleeve is provided to attempt to assist in unwinding of the tether rope from around the stake. The rotatable element and the sleeve, however, tend to move together as a unit, if they can rotate at all. Moreover, when animals of any size or strength are tethered to such a stake, the upward pull of the animal can bind the rotatable element and sleeve together to cause them to rotate as a unit and to inhibit rotation in general. Still further, the large eyelet portion of the rotatable element allows the tether line to move in close to the stake so that the moment arm which would enhance unraveling of the line from around the stake is reduced.

The net result of prior art tether stake assemblies has been that animals cannot be reliably tethered to the stake without tangling to the point of significantly reducing their mobility about the stake. Once the tether stake assembly becomes frozen so that it will not rotate, the animal invariably proceeds to wrap the line around the stake until he has progressively reduced the length of the tether to the point that it is dangerous to the unsupervised animal.

OBJECTS OF THE INVENTION

Accordingly, it is an object of the present invention to provide a tether post assembly which is truly tangle-free and may be used to tether unsupervised animals without significantly reducing the area in which they are free to move.

Another object of the present invention is to provide a tangle-free tether post assembly which can be used for a wide variety of animals and is durable and easy to construct.

Still another object of the present invention is to provide a tangle-free tether post assembly which can be easily installed and removed with simple hand tools.

The tether post assembly of the present invention has other objects and features of advantage which will become apparent from and are set forth in more detail in the following description and the accompanying drawing.

SUMMARY OF THE INVENTION

The tangle-free tether post assembly of the present invention includes elongated post means formed with a lower end adapted to be buried in the ground and an upper end formed to project upwardly above ground level, tether securement means mounted to the upper end for rotation about the longitudinal axis of the post and formed for attachment of a tether thereto, and longitudinally extending sleeve means mounted for rotation about the longitudinal axis to the upper end of the post. The improvement in the tether post assembly of the present invention is comprised, briefly, of the tether securement means being mounted to and retained on the upper end of the post at a position vertically spaced above ground level and at a position vertically above at least a portion of the sleeve means for all angular positions of the tether securement means. The tether securement means is further formed to secure the tether means thereto at a radially spaced location from the sleeve means. Additionally, the tether securement means is free for rotation completely independently of the sleeve means, and the post assembly is preferably provided with ground anchor means and an eyelet suitable for removal of the post from the ground by rotation of the same.

DESCRIPTION OF THE DRAWING

FIG. 1 is a top perspective view of a tangle-free tether post assembly constructed in accordance with the present invention.

FIG. 2 is an enlarged top plan view of the tether post assembly of the present invention with the tether line shown in phantom.

FIG. 3 is a top plan view corresponding to FIG. 2 with the tether line shown wrapped around the post.

FIG. 4 is a side elevation view in reduced scale of the tether post assembly of FIG. 1.

FIG. 5 is an enlarged, fragmentary, side elevation view of the upper end of the tether post assembly of FIG. 1.

DESCRIPTION OF THE PREFERRED EMBODIMENT

The tangle-free tether post assembly of the present invention includes elongated post means, generally designated 21, formed with a lower end 22 adapted to be buried in the ground and an upper end 23 formed to project upwardly above ground level 24. Mounted for rotation about the longitudinal axis of the post is tether securement means, generally designated 26, which is formed for attachment of a tether line 27 thereto. Also rotatably mounted to upper end 23 of the post assembly is a longitudinally extending sleeve means 28.

The elements thus far described in the tether post assembly of the present invention can be found in prior art tether post assemblies, for example in U.S. Pat. No. 3,100,476. In the tether post assembly of the present invention, however, there is an improved arrangement of these elements which provides a tether post that is truly tangle-free.

In the improved assembly of the present invention, tether securement means 26 is mounted to and retained on upper end 23 of the post at a position vertically spaced above ground level 24 and at a position at which securement means 26 is at least partially above rotatable sleeve 28. The retention of the securement means for the tether line on the post at a vertically-spaced distance above the ground ensures that the line will be above the ground, even when it is slack. Thus, as the animal walks back and forth in close proximity to the tether post, there is a greatly reduced likelihood that debris will be pulled into the post by line 27, or at least to a position proximate the post that would interfere with rotation of securement means 26.

Similarly, the projection of the post a substantial distance above the ground reduces the likelihood that the animal can cause the line to be looped over the top of the post in ways which would cause knotting or tangling. The animal can and will wind tether line 27 around the post in the slack condition, but the vertical spacing above the ground of the rotatable securement element ensures that looping and debris will not cause tangling of the line.

The positioning of the securement means above rotatable sleeve 28 further enhances unwinding of line 27 from a coiled position around the post. Winding of line 27 around the post will occur under slack conditions. Under tensioned conditions, securement means 26 will simply rotate and prevent winding. Under slack conditions the tether line 27 will naturally droop under the influence of gravity and be wound on rotatable sleeve 28 below the rotatable securement element 26, as shown in FIGS. 1 and 3. When the animal tensions the line, the force, F, on the line can be seen in FIG. 3 to act at a radial distance, r, on sleeve 28. The tether line will tend to slide around the sleeve so that force F is applied to eyelet 31 of securement means 26. The application of tension force, therefore, causes a combination of rotation of sleeve 28 and washer element 32 to which eyelet 31 is secured. In most cases the application of a tension force on a tether line which has several wraps around sleeve 28 will cause rotation of both the sleeve and washer 32, but in some cases the sleeve is relatively stationary and the tension force is merely transmitted to the washer by sliding of the tether line around the sleeve and rotation of the washer until the line is unwound from the post and the eyelet pulled into line with the tether.

As may be seen from FIGS. 2 and 3, the washer and eyelet structure of securement means 26 ensures that the tether line is at a substantial radius, R, from the central longitudinal axis of the post, which radius enhances the moment which will be applied to the washer by the tether. In a preferred form, radial distance R to the eyelet is about twice the radius r of sleeve 28.

As best may be seen in FIGS. 4 and 5, washer 32 is preferably mounted for rotation to upper end 23 of post 21 by mounting the same between two guide washers 33 and 34. Lower guide washer 34 acts as an upper limit and guide for sleeve 28, while a third washer 36 is mounted below and acts as a lower limit for sleeve 28. As thus constructed, tether securement washer 32 is mounted to be free for rotation independently and in an isolated manner from rotation of sleeve 28. The rotation of either unit, therefore, will not depend upon the other, nor will there be any tendency of one to bind against or freeze the other. Even if the sleeve 28 should become frozen or locked against rotation by debris, the tether line can slide over the sleeve surface, which is smooth, as the tether securement washer 32 rotates independently of the frozen sleeve.

The tether post assembly of the present invention is further preferably formed with ground anchor means, generally designated 37, which is secured to lower end 22 of the post and formed for removal of the post from the ground by rotation of the post about its longitudinal axis. Usually the tether post assembly of the present invention can be installed or placed by digging a hole in the ground by means of a shovel or post hole digger. The post will then be dropped into the ground until lower sleeve guide washer 36 is about at ground level. Upper end 23 of the post will project above the ground preferably at least four sleeve diameters above ground level 24. The hole will then be filled in, and fluted ground anchor means 37 is buried below ground level and anchors the post adding to its stability. When the post is to be removed, however, it is preferable not to have to dig up the post. Instead, the post can be rotated about its longitudinal axis and flutes 37 will unwind or unscrew the post out of the ground. In order to facilitate such a removal of the post, eyelet means 38 is preferably secured to the upper end of the post, for example, by welding, so that the pointed end of a hand tool, such as a pick, can be inserted into eyelet 38 and used to rotate the post.

The post assembly of the present invention is preferably made from tubular steel members having sizes which are commensurate with the animal being secured. For smaller animals such as dogs and goats, for example, a post approximately 2½ feet high formed from 1⅜ inch steel tubing has been found to be satisfactory. The post projects above the ground a distance of about 10 inches which is a little more than six times the diameter of sleeve 28. Washer 32 has a diameter of about 4½ inches with the guide washers 33 and 34 being about 3 inches in diameter so that there is a substantial surface bearing upon washer 32 in both the upwardly facing and downwardly facing sides of washer 32 to resist any tendency of the washer, which is ⅛ inch in thickness, to bend or become bound between the guide washers. For tether post assemblies for horses or larger animals, the size of the post and components therefore may be scaled correspondingly.

What is claimed is:

1. A tangle-free tether post assembly for tethering animals including elongated post means formed with a lower end adapted to be buried in the ground and an upper end formed to project upwardly above ground level, tether securement means mounted to said upper end for rotation about the longitudinal axis of said post means and formed for attachment of tether means thereto, and longitudinally extending sleeve means mounted above ground level to said upper end for rotation about said axis, wherein the improvements in said tether post assembly are comprised of:

said tether securement means being mounted to and retained on said upper end of said post means by means isolating rotation of said tether securement means from rotation of said sleeve means, said means isolating rotation being positioned at a position vertically spaced above ground level and at a position vertically above at least a portion of said sleeve means, and said tether securement means securing said tether means thereto at a radially spaced location from said sleeve means.

2. The tangle-free tether post assembly as defined in claim 1 wherein, said tether securement means is mounted to said upper end by said means isolating rotation at a location above all of said sleeve means.

3. The tangle-free tether post assembly as defined in claim 1 wherein, said tether securement means is provided by a washer element mounted above said sleeve means.

4. The tangle-free tether post assembly as defined in claim 1, and ground anchor means secured to said lower end and formed for removal of said lower end from the ground by rotation of said post means about said longitudinal axis.

5. The tangle-free tether post assembly as defined in claim 4, and eyelet means to said upper end and formed for the application of a torque to said post means to enable rotation of said post means about said longitudinal axis.

6. The tangle-free tether post assembly as defined in claim 1 wherein, said means isolating rotation of said tether securement means is provided by a guide washer fixedly mounted to said post means at a height above said sleeve means, and said tether securement means is provided by a securement washer rotatably mounted to said post means above said guide washer, said securement washer extending radially from said post means by a distance greater than said guide washer.

* * * * *